June 12, 1962  J. S. ALFORD  3,038,304
VARIABLE EXHAUST NOZZLE CONFIGURATION
Filed April 17, 1959

INVENTOR.
JOSEPH S. ALFORD
BY Robert B. Crouch
ATTORNEY

United States Patent Office 3,038,304
Patented June 12, 1962

3,038,304
VARIABLE EXHAUST NOZZLE CONFIGURATION
Joseph S. Alford, Cincinnati, Ohio, assignor to General Electric Company, a corporation of New York
Filed Apr. 17, 1959, Ser. No. 807,118
2 Claims. (Cl. 60—35.6)

The present invention relates to a variable exhaust nozzle configuration for aircraft propulsion systems and more particularly to a variable exhaust nozzle configuration having low external drag characteristics at subsonic and supersonic aircraft speeds.

In the design of exhaust nozzles which are adaptable for both subsonic non-thrust augmented and supersonic augmented (i. e. afterburning) aircraft operation, it is desirable to make the nozzle adjustable so that it performs as a convergent nozzle at subsonic aircraft speeds and as a convergent-divergent nozzle at transonic and supersonic speeds. For successful operation such a nozzle must compress and diffuse the exhause gases efficiently and the external or base drag of the nozzle must be kept to a minimum. From the standpoint of internal performance it is desirable to have a nozzle in which both the throat area and exit area are variable without interposing any blockage in the interior of the exhaust stream. From the standpoint of external performance the exterior form of the nozzle must be adjustable so that the base drag characteristics of the nozzle may be held to a minimum during both subsonic and supersonic operation. Heretofore efforts providing an exhaust nozzle adaptable for both subsonic and supersonic operation have been directed primarily to improving internal nozzle performance. This has resulted in nozzles which have been designed for one flight condition, and which have a consequent compromise in performance at off-design conditions. In the ususal case this has meant efficient external performance at supersonic speeds, but high base drag characteristics at subsonic speeds. Such compromise in off-design performance is avoided by the present invention by the provision of an efficient variable exhaust nozzle which is internally dimensioned for maximum performance and externally dimensioned to provide minimum base drag characteristics over a wide range of aircraft speed.

An object of the present invention is to provide a variable exhaust nozzle which produces maximum thrust of the propulsion system and operates efficiently with minimum base drag characteristics at subsonic and supersonic aircraft speeds.

To accomplish the above result, applicant provides a variable convergent-divergent exhaust nozzle for an aircraft propulsion system including an outer nacelle, an inner tailpipe, a first series of adjustable fingers on the tailpipe, and an afterbody, the nacelle trailing edge curving to form a transition section with the afterbody of predetermined radius, the afterbody including a cylindrical section and pivotally secured thereto to define the nozzie exit area, a second series of adjustable fingers havings inner and outer surfaces. At supersonic speeds the outer surfaces form a cylindrical extension of said section, and at subsonic speeds they form a conical section whose sides make an flangle of approximately 15° with the generally cylindrical section while the inner surfaces mechanically form a divergent portion of the nozzle at both supersonic and subsonic speeds.

Other objects and many of the intended advantages of this invention will be readily appreciated as the same becomes understood by reference to the following detailed description when considered in connection with the accompanying drawings wherein.

Figure 1:
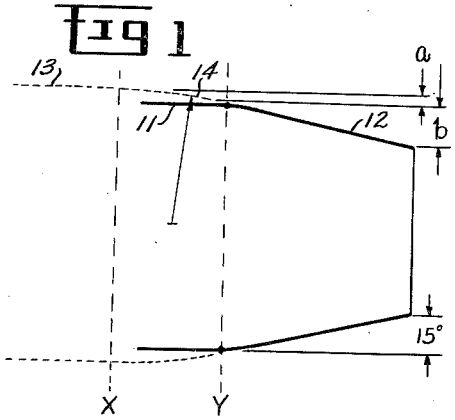
FIG. 1 is a schematic view showing the external configuration of a nozzle according the present invention.

Referring to FIG. 1 of the drawing, an exhaust nozzle is illustrated which includes a generally cylindrical section 11 and a series of adjustable fingers or flaps 12 pivotally secured to the downstream circumferential edge thereof. The cylindrical section 11 forms an extension of an engine nacelle 13 and the fingers 12 define the downstream surface of afterbody of the nacelle. The nacelle lines or walls converge at a small angle, 2 or 3 degrees, in the downstream direction. The trailing edges of the nacelle are bent inwardly in a small curve 14, the radius of which is approximately equal to that of the nacelle. The outer surfaces of the fingers are straight in length, so that in their closed position for subsonic operation they define a conical afterbody for the nacelle. The curve 14 forms a blend curvature or transition section between the nacelle and the conical afterbody. As illustrated, the boat-tail angle, which is the angle between the sides of the cylindrical section and the fingers in their closed position, is approximately 15°.

Figure 2:
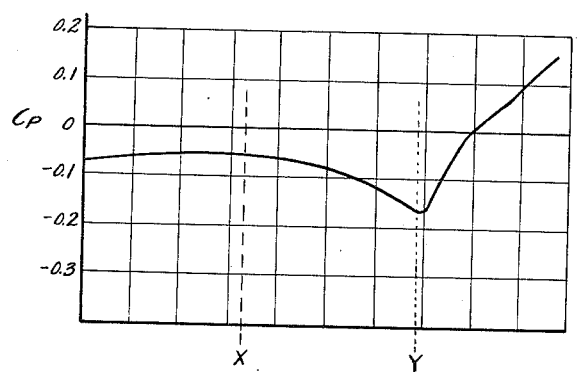
FIG. 2 is a graph showing the external surface pressures which determine the base drag characteristics of the nozzle of FIG 1.

Wind tunnel tests have demonstrated that a relatively small radius blend curvature between the nacelle and the nozzle fingers is desirable for cruising flight at high transonic flight speeds. If the boat-tail angle is kept relatively small, approximately 15°, the static pressure drops sharply at the blend curvature, but rises very rapidly as the blend curvature becomes tangent with the conical afterbody. The result is that the low static pressure caused by the turning of the flow at the blend curvature acts over a relatively small projected annular base area which is illustrated at (a) in FIG. 1. Since the static pressure rises very rapidly aft of the blend curvature, a positive static pressure acts over the relatively large projected base annulus area (b), thus reducing the total drag loss with a corresponding improvement in net forward thrust. This fact is illustrated in FIG. 2 wherein external surface pressure which determines the base drag along the nacelle and nozzle is plotted in terms of pressure coefficient referred to ambient static pressure. As shown, the external pressure along the nacelle remains fairly constant until station X—X where it decreases along the converging nacelle lines. After station Y—Y, which is the hinge point of the nozzle fingers, the external pressure increases rapidly until it becomes a positive pressure acting over the major length of the outer surfaces of the fingers 12. This results in a reduction in the overall nacelle drag of up to thirty-five precent.

Figure 3:
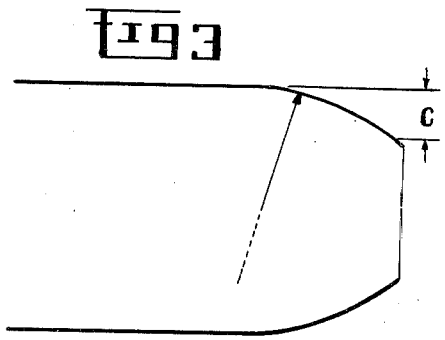
FIGS. 3 and 4 are schematic views of prior art nozzles.

Referring to FIG. 3, a large radius blend curvature has been regarded by some aircraft designers as a requirement for the afterbody blend curvature if acceptably low base drag were to be obtained at subsonic flight speeds. If a blend curvature having a radius of from 4 to 6 times that of the nacelle is used between the nacelle and the conical afterbody, the reduction of the static pressure caused by turning the external flow is not as great as for the small radius blend curvature. However, in this case the low pressure extends over the whole length of the curved wall which represents a large projected base annular area (c). An decrease in external drag downstream of the blend curvature acts over a very small projected base area. Accordingly, in such a nozzle, the overall resultant is an increment of base drag.

Figure 4:
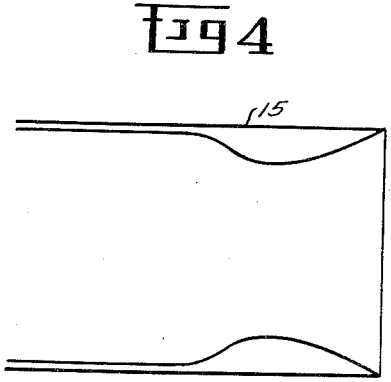

The convergent-divergent nozzle illustrated in FIG. 4 shows the optimum external nozzle configuration for efficient operation at supersonic flight speeds. In such a nozzle the boat-tail angle is essentially zero and the outer surface 15 of the nozzle defines a cylindrical extension of the nacelle. This configuration permits shockless flow of ambient air along the nacelle and nozzle, since there are no discontinuities which will generate a shock wave. In this connection, the lines of the nacelle and afterbody need not be absolutely parallel to the longitudinal axis thereof for shockless flow, but they should be approximately parallel, generally within 3 degrees. In addition any departures from a straight line must be gradual and smoothly contoured to prevent generation of shock waves in the air flow along the nacelle.

Figure 5:
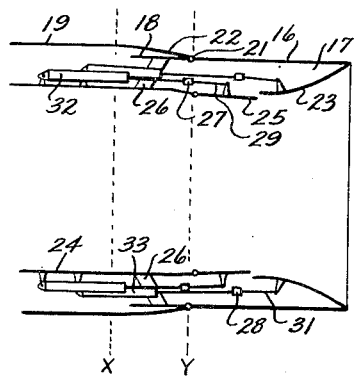
FIGS. 5 and 6 are elevation views in section of a convergent-divergent nozzle embodying the present invention.
Figure 6:
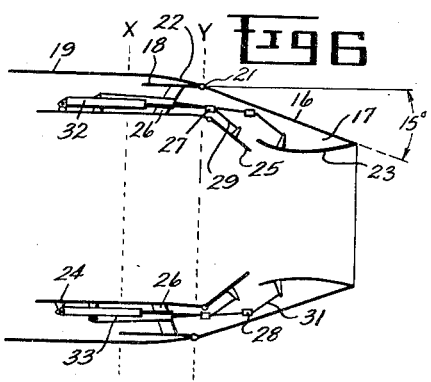

Referring to FIGS. 5 and 6 of the drawing, the concept of the present invention is illustrated as applied to a variable convergent-divergent nozzle. In FIG. 5 the nozzle is shown in its open position wherein it is adapted for sonic and supersonic operation. In this position, the outer surfaces or walls 16 of the secondary fingers 17 form a cylindrical extension of tubular member 18 which is in turn an extension of the nacelle 19 or fuselage, depending upon the particular application of the nozzle. Fingers 17 are hinged to the trailing edges of the member 18 as at 21. A small radius blend curvature 22 extends between the nacelle and member 18. In the open position of the nozzle, the blend curvature 22 creates a shallow depression in the nacelle line. Since the contours of this depression are smooth and since the curvature is gradual, any disturbances in the air flow at this point will be too weak to cause separation of the air flow from the outer surface of the secondary fingers. Accordingly, the nozzle disclosed will operate with shockless flow near peak efficiency at supersonic speeds. As illustrated, each secondary finger 17 is provided with an internal wall 23 which is connected to the outer surface 16 at the trailing edge of the finger. For this application, a tailpipe 24 is positioned concentrically within member 18, and a series of primary fingers 25 are hinged to the trailing edges of the tailpipe. Member 18 is also supported on the tailpipe as by brackets 26. Actuator rings 27 and 28 are connected to the primary and secondary fingers by means of links 29 and 31 respectively. Actuators 32 and 33 are connected to the rings 27 and 28 respectively, to impart axial movement thereto and control the positions of the primary and secondary fingers. In its open position, illustrated in FIG. 5, the nozzle forms a convergent-divergent nozzle in which the throat area is defined by the primary fingers 25 and the exit area is defined by the secondary fingers 17. In such position, the inner walls 23 of the secondary fingers, each of which extends inwardly forward of a point adjacent the trailing edge of the secondary finger 17, mechanically define the divergent portion of the nozzle. This furnishes complete guidance of the expansion process by restricting sidewise expansion of exhaust gases while providing a rearward facing area for the gases to exert reaction upon.

Referring to FIG. 6, the convergent-divergent nozzle is illustrated in its closed position wherein it is adapted for non-augmented subsonic operation. In this position, the nozzle operates as a conventional convergent exhaust nozzle wherein the nozzle throat area is defined by the primary fingers 25, except that here, as in the open position, the inner walls 23 of the secondary fingers mechanically define the divergent portion in the nozzle to prevent over-expansion of the exhaust gases which might otherwise occur; thus enhancing nozzle efficiency. In this position, the small blend curvature 22 and the conical afterbody formed by the straight outer surfaces 16 of the secondary fingers cooperate to provide favorable forward thrust as described in connection with FIGS. 1 and 2.

When applied to a convergent-divergent nozzle, such as illustrated in FIGS. 5 and 6, the present invention permits optimum external nozzle performance at subsonic and supersonic aircraft speeds. As pointed out above, in its open position a convergent-divergent nozzle embodying the present invention conforms very closely to the ideal configuration for supersonic flight. In addition, in the closed position of the nozzle the present invention will not only reduce the external afterbody drag to a minimum, but will maximize internal nozzle performance by reduction or elimination of losses due to uncontrolled expansion.

While the present invention has particular applicability to a variable convergent-divergent nozzle, it is also applicable to a convergent nozzle which is adapted exclusively for subsonic operation.

While a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What I claim is:

1. In combination, a generally cylindrical nacelle for an aircraft propulsion system and a variable area convergent-divergent exhaust nozzle, said nozzle having a series of primary fingers defining a nozzle throat area and an afterbody, the nacelle trailing edges being curved inwardly to form a transition section between the nacelle and afterbody, the radius of said transition section being approximately equal to that of the nacelle, the afterbody including a cylindrical member telescoped within the trailing edges of the nacelle, and a circular series of secondly exhaust nozzle fingers pivotally connected to the cylindrical member, said secondary fingers having inner and outer surfaces; and actuation means connected to the fingers for pivoting them between an open position in which said outer surfaces form a cylindrical extension of the nacelle and a closed position in which the outer surfaces define a conical section having a boat-tail angle of approximately 15 degress.

2. In combination with an aircraft propulsion system including an outer nacelle and an inner tailpipe, a variable area convergent-divergent exhaust nozzle having a circular series of primary fingers pivotally mounted on said tailpipe to define a nozzle throat area, and an afterbody, the trailing edges of said nacelle curving inwardly to form a transition section between the nacelle and afterbody, the radius of said transition section being approximately equal to that of the nacelle, said afterbody comprising: a cylindrical member concentric with and spaced from the primary fingers, the cylindrical member being supported from the tailpipe; a circular series of elongated secondary fingers having inner and outer surfaces, said outer surfaces having leading and trailing edges, the leading edges of the outer surfaces being pivotally connected to the cylinderical member, the trailing edges extending downstream therefrom and defining the nozzle exit area, said inner surfaces extending inwardly forward of the trailing edges of said outer surfaces; and first and second actuation means connected to the primary and secondary fingers respectively for pivoting them between an open position for supersonic operation and a closed position for subsonic operation, the outer surfaces of the secondary fingers in the open position forming a cylindrical section and in the closed position a conical section having a boat-tail angle of approximately 15 degrees, said inner surfaces confining the exhaust when the nozzle is in the closed position.

References Cited in the file of this patent

UNITED STATES PATENTS

| | | |
|---|---|---|
| 2,840,984 | Laucher | July 1, 1958 |
| 2,910,828 | Meyer | Nov. 3, 1959 |
| 2,932,163 | Hyde | Apr. 12, 1960 |
| 2,972,226 | Geary | Feb. 21, 1961 |

FOREIGN PATENTS

| | | |
|---|---|---|
| 750,307 | Great Britain | June 13, 1956 |